United States Patent
Wu et al.

(10) Patent No.: US 8,558,869 B2
(45) Date of Patent: Oct. 15, 2013

(54) IMAGE PROCESSING METHOD AND DEVICE

(75) Inventors: Jiaoli Wu, Shenzhen (CN); Yang Zhao, Shenzhen (CN); Jing Wang, Shenzhen (CN); Kai Li, Shenzhen (CN); Yuan Liu, Shenzhen (CN); Song Zhao, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 85 days.

(21) Appl. No.: 13/417,752

(22) Filed: Mar. 12, 2012

(65) Prior Publication Data

US 2012/0169833 A1 Jul. 5, 2012

Related U.S. Application Data

(63) Continuation of application No. PCT/CN2010/076757, filed on Sep. 9, 2010.

(30) Foreign Application Priority Data

Sep. 11, 2009 (CN) .......................... 2009 1 0172948

(51) Int. Cl.
*H04N 7/15* (2006.01)
(52) U.S. Cl.
CPC .................................... *H04N 7/15* (2013.01)
USPC ................... 348/14.08; 348/14.12; 348/14.09
(58) Field of Classification Search
USPC ............. 348/14.01–14.16; 370/260; 709/204; 715/752
See application file for complete search history.

(56) References Cited

U.S. PATENT DOCUMENTS

| | | | |
|---|---|---|---|
| 2002/0063777 A1 | 5/2002 | Maekawa | |
| 2006/0284810 A1* | 12/2006 | Aratani et al. | 345/90 |
| 2008/0062252 A1* | 3/2008 | Kawamura et al. | 348/14.09 |

FOREIGN PATENT DOCUMENTS

| | | |
|---|---|---|
| CN | 101198008 A | 6/2008 |
| CN | 101286314 A | 10/2008 |
| CN | 101527828 A | 9/2009 |
| JP | 2003-250153 A | 9/2003 |
| WO | WO 2007123960 A2 | 11/2007 |
| WO | WO 2009049163 A1 | 4/2009 |

OTHER PUBLICATIONS

Chinese Patent No. 102025891, issued on Nov. 7, 2012, granted in corresponding Chinese Patent Application No. 200910172948.4.

(Continued)

*Primary Examiner* — Melur Ramakrishnaiah
(74) *Attorney, Agent, or Firm* — Brinks Hofer Gilson & Lione

(57) ABSTRACT

Embodiments of the present invention provide an image processing method and device, relating to the field of communications technology. The method includes: receiving at least two channels of images transmitted from a remote conference site; if there is a blind area in splicing of the at least two channels of images, comparing the width of the blind area with the sum of the widths of a left border and a right border of a display apparatus in a local conference site; processing the at least two channels of images separately according to a comparison result; outputting the at least two channels of processed images separately to the display apparatuses in the local conference site for displaying. In the embodiments of the present invention, the optimal image display effect may be achieved and the user experience in a telepresence video conference may be improved.

13 Claims, 3 Drawing Sheets

(56) References Cited

OTHER PUBLICATIONS

International Search Report from the State Intellectual Property Office of P.R. China for International Application No. PCT/CN2010/076757 mailed Dec. 16, 2010.

Written Opinion of the International Searching Authority issued in corresponding PCT Patent Application No. PCT/CN2010/076757, mailed Dec. 16, 2010.

Extended European Search Report issued in corresponding European Patent Application No. 10815000.4, mailed Nov. 9, 2012.

* cited by examiner

IMAGE PROCESSING METHOD AND DEVICE

CROSS-REFERENCE TO RELATED APPLICATIONS

This application is a continuation of International Application No. PCT/CN2010/076757, filed on Sep. 9, 2010, which claims priority to Chinese Patent Application No. 200910172948.4, filed on Sep. 11, 2009, both of which are hereby incorporated by reference in their entireties.

BACKGROUND OF THE FIELD

The present invention relates to the field of communications technologies, and particularly to an image processing method and device.

BACKGROUND OF THE INVENTION

Telepresence, as a new technology, is widely used in various video conferences. The telepresence provides life-size images, ultra-high definition resolution, audio with stereoscopic impression, and a specially designed environment, to create a "room in a room" video conference. The telepresence video conference provides an immersive and face-to-face conference experience for users so that the users feel that all participants are in a same room, thereby solving the problems in conventional video conference that the communication is not real enough, the sizes of humans are not consistent, the image is fuzzy, and the image is not synchronous with the sound.

In the telepresence video conference, each video camera in the local conference site corresponds to a different user area, and each video camera simultaneously takes images in the corresponding user area and transmits the images to a conference terminal in a remote conference site. The conference terminal in the remote conference site splices the images taken by the video cameras in the local conference site by using a physical or digital splicing technology, and outputs the images to an adjacent display apparatus in the remote conference site for displaying. Meanwhile, the conference terminal in the local conference site also splices the images taken by the video cameras in the remote conference site by using the physical or digital splicing technology, and outputs them to the adjacent display apparatus in the local conference site for displaying. In order to make the image splicing smooth, the local conference site and the remote conference site usually choose a fixed model of display apparatuses, at least the borders of the display apparatuses are the same.

With the upgrade of the display apparatus, the screen size and the border size of the display apparatus change. Using a new narrow border display apparatus to splice images better helps to improve the user experience, but no solution is provided to adjust the images to achieve an optimal display effect under the condition that the user upgrades the display apparatus.

SUMMARY OF THE INVENTION

Embodiments of the present invention provide an image processing method and device, which are capable of achieving an optimal image display effect and improving user experience in a telepresence video conference.

In order to achieve the above objectives, the embodiments of the present invention provide the following technical solutions.

An embodiment of the present invention provides an image processing method, including:

receiving at least two channels of images transmitted from a remote conference site;

if there is a blind area in splicing of the at least two channels of images, comparing the width of the blind area with the sum of the widths of a left border and a right border of a display apparatus in a local conference site;

processing the at least two channels of images separately according to a comparison result; and outputting the at least two channels of processed images separately to the display apparatuses in the local conference site for displaying.

An embodiment of the present invention provides an image processing device, including:

a receiving module, configured to receive at least two channels of images transmitted from a remote conference site;

a first control module, configured to, when there is a blind area in splicing of the at least two channels of images, compare the width of a blind area with the sum of the widths of a left border and a right border of a display apparatus in a local conference site, and process the at least two channels of images separately according to a comparison result; and an output module, configured to output the at least two channels of processed images separately to the display apparatuses in the local conference site for displaying.

According to the above technical solutions, the embodiments of the present invention have the following advantages:

In the embodiments of the present invention, the width of the blind area after the splicing of the at least two channels of images is compared with the sum of the widths of a left border and a right border of the display apparatus in the local conference site, and the at least two channels of images are processed separately according to the comparison result (such as cutting or loading a black band) so that the at least two channels of processed images match the size of the display apparatus in the local conference site, which thereby achieves the optimal image display effect and improving the user experience in a telepresence video conference.

BRIEF DESCRIPTION OF THE DRAWINGS

The accompanying drawings described here are used to provide further understanding for the present invention, which constitute a part of this application, but are not intended to limit the present invention. In the drawings.

DETAILED DESCRIPTION OF THE INVENTION

To make the objectives, technical solutions, and advantages of the present invention clearer, the present invention is further illustrated in detail in the following with reference to the embodiments and the accompanying drawings. The illustrative implementation manners of the present invention and the description thereof are used to describe the present invention, but do not serve as a limitation of the present invention.

Figure 1:
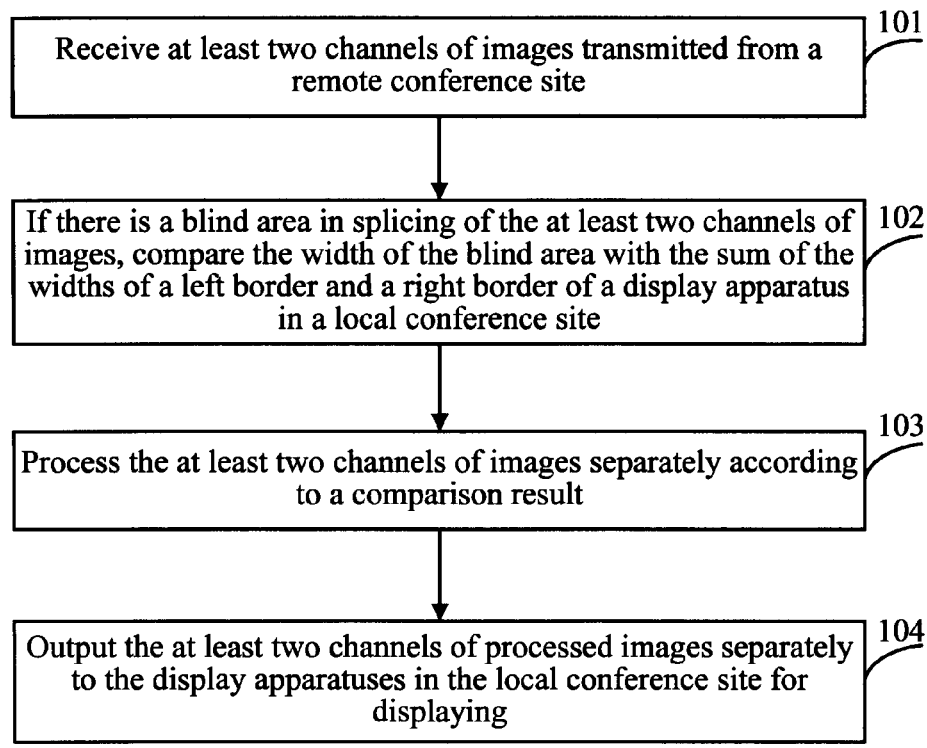
FIG. 1 is a schematic flow chart of an image processing method according to an embodiment of the present invention.

Referring to FIG. 1, FIG. 1 is a flow chart of an image processing method according to an embodiment of the present invention. As shown in FIG. 1, the method may include the following steps:

101: Receive at least two channels of images transmitted from a remote conference site.

In the remote conference site, each video camera takes a channel of images. The video camera is controllable, that is, the video camera may be controlled through an instruction transmitted from a program, to have three-dimensional movements such as rotation, translation, and stretching. If the shooting mode of the video cameras in the remote conference site is different, the splicing manner of the taken multiple channels of taken images is different too.

The common shooting mode of the video cameras includes but is not limited to: a divergence mode, a convergence mode, a parallel mode, a co-optical-center mode, or an approximate co-optical-center mode. For example, if the shooting mode of the video cameras is the divergence mode, there may be a blind area in the splicing manner of the multiple channels of taken images (that is, seam connection). And for another example, when the shooting mode of the video cameras is the co-optical-center mode or the approximate co-optical-center mode, there may be an overlapping area in the splicing manner of the multiple channels of taken images.

102: If there is a blind area in splicing of the at least two channels of images, compare the width of the blind area with the sum of the widths of a left border and a right border of a display apparatus in a local conference site.

For example, the display apparatus in the embodiments of the present invention may include a narrow seam display apparatus with the sum of the widths of the left border and the right border being about 5-20 mm, a wide seam display apparatus with the sum of the widths of the left border and the right border being about 15-60 mm, or even a seamless display apparatus with the sum of the widths of the left border and the right border being approximately 0.

103: Process the at least two channels of images separately according to a comparison result.

104: Output the at least two channels of processed images separately to the display apparatuses in the local conference site for displaying.

After each channel of images is processed in step 103, each channel of images may be output to a display apparatus in the local conference site for displaying. Preferably, the screen size of each display apparatus in the local conference site is the same, and the sum of the widths of the left border and the right border of each display apparatus is the same.

Figure 2:
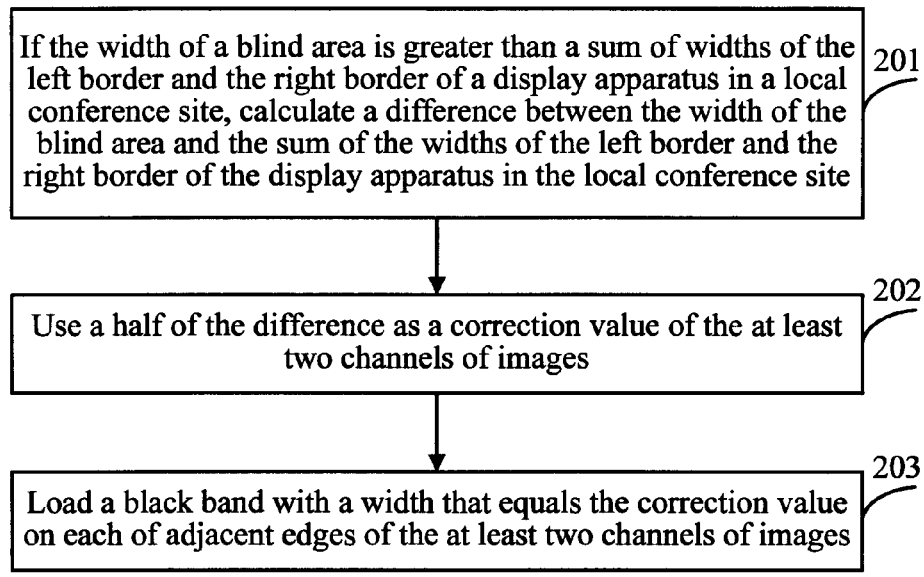
FIG. 2 is a schematic flow chart of a method for processing at least two channels of images separately according to a comparison result according to an embodiments of the present invention.

For example, during the processing the at least two channels of images separately according to the comparison result in step 103, a method shown in FIG. 2 may be used. As shown in FIG. 2, the method may include the following steps.

201: If the width of the blind area is greater than the sum of the widths of the left border and the right border of the display apparatus in the local conference site, calculate a difference between the width of the blind area and the sum of the widths of the left border and the right border of the display apparatus in the local conference site.

202: Use a half of the difference as a correction value of the at least two channels of images.

203: Load a black band with a width that equals the correction value on each of adjacent edges of the at least two channels of images.

Figure 3:
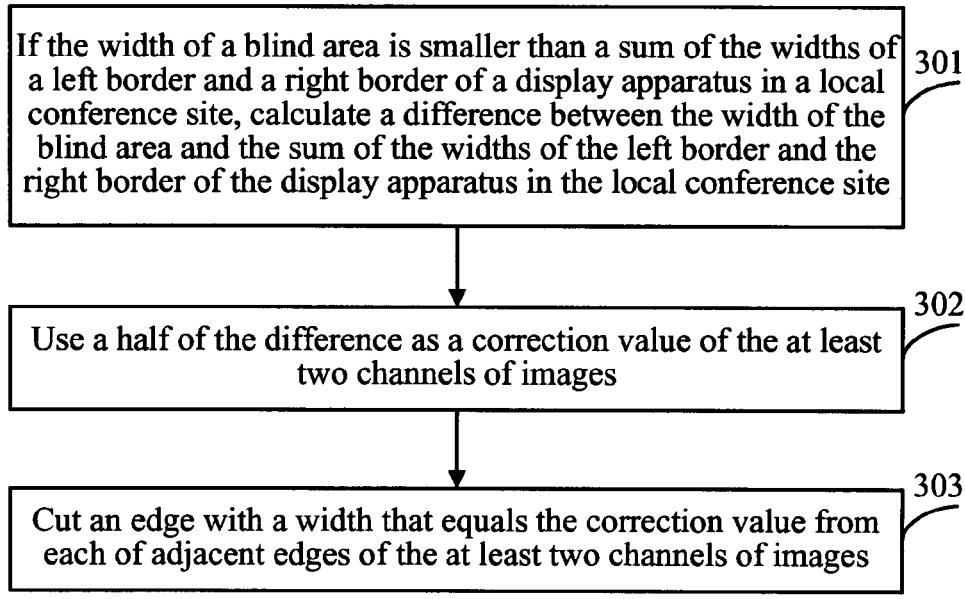
FIG. 3 is a schematic flow chart of another method for processing at least two channels of images separately according to a comparison result according to an embodiment of the present invention.

For example, during the processing the at least two channels of images separately according to the comparison result in step 103, a method shown in FIG. 3 may also be used. As shown in FIG. 3, the method may include the following steps.

301: If the width of the blind area is smaller than the sum of the widths of the left border and the right border of the display apparatus in the local conference site, calculate a difference between the width of the blind area and the sum of the widths of the left border and the right border of the display apparatus in the local conference site.

302: Use a half of the difference as a correction value of the at least two channels of images.

303: Cut an edge with a width that equals the correction value from each of adjacent edges of the at least two channels of images.

In addition, if the width of the blind area is equal to the sum of the widths of the left border and the right border of the display apparatus in the local conference site, or the width of the blind area of the at least two channels of images is 0, the at least two channels of received images may be output separately in sequence to the display apparatuses in the local conference site for displaying.

In addition, in the image processing method according to the embodiments of the present invention, a panoramic image transmitted from the remote conference site may be received, and the panoramic image is spliced in the remote conference site. Meanwhile, the panoramic image may be cut according to the border size of the display apparatus in the local conference site, so as to obtain multiple channels of images, which are then separately output to the display apparatuses in the local conference site for displaying.

Further, in the embodiments of the present invention, the multiple channels of obtained images may undergo stretching or shrinking processing according to the size of the display apparatus in the local site, so that the images adapt to the size of the display apparatus in the local conference site.

Further, if the display apparatus in the local conference site is a panoramic seamless display apparatus (such as a high resolution projection display apparatus or an 108-inch Liquid Crystal Display), the panoramic image does not need to be cut, and the panoramic image may be directly output to the panoramic seamless display apparatus for displaying.

Preferably, the image processing method provided in the embodiments of the present invention may further include the following steps.

(1) Receive information which is about the display apparatus in the remote conference site and transmitted from the remote conference site.

For example, the remote conference site may transmit the information about the display apparatus in the remote conference site through a dedicated channel, or may carry the information about the display apparatus in the remote conference site by extending the communication protocol between the remote conference site and the local conference site, such as extending H.323, H.320, SIP, or E1.

The display apparatus information is used to indicate that the display apparatus in the remote conference site is the panoramic seamless display apparatus, or is the narrow seam display apparatus, the wide seam display apparatus, or the seamless display apparatus which is mentioned above.

(2) Adjust the shooting mode of the video cameras in the local conference site according to the display apparatus information.

For example, if the display apparatus information in step (1) indicates that the display apparatus in the remote conference site is the panoramic seamless display apparatus, the shooting mode of the video cameras in the local conference site may be adjusted to the co-optical-center mode, the approximate co-optical-center mode, or the convergence mode in step (2); otherwise, the shooting mode of the video cameras in the local conference site may be adjusted to the divergence mode in step (2).

In the embodiments of the present invention, the remote conference site may, through the dedicated channel or by extending the communication protocol with the local conference sites, inform the local conference site of the width of the blind area corresponding to the at least two channels of images taken in the remote conference site. In this way, after the local conference site receives the images transmitted from the remote conference site, the at least two channels of images may be cut or added with a black band.

In order to better understand the effect of the embodiments of the present invention, illustration is to be made with some examples in the following. Assume the remote conference site transmits two channels of images, namely, image 1 and image 2, where there is a blind area between image 1 and image 2, and the width of the blind area is 12 mm; assume there is display apparatus 1 and display apparatus 2 which are adjacent to each other in the local conference site, where display apparatus 1 and display apparatus 2 are both narrow seam display apparatuses with the sum of the left border and the right border being 10 mm.

Obviously, if image 1 and image 2 are directly output to display apparatus 1 and the display apparatus 2 respectively for displaying, because the sum of adjacent edges of the display apparatus 1 and the display apparatus 2 is also 10 mm, in the view of a user, the user may feel that image 1 and image 2 are compressed, which thereby reduces the user experience of the telepresence video conference.

If according to the method provided in the embodiments of the present invention, a black band with a width of 1 mm (as the correction value of the image 1 and the image 2) is loaded on each of the adjacent edges of the display apparatus 1 and the display apparatus 2, in the view of the user, the distance between the adjacent edges of the image 1 and the image 2 is just equal to the width of the blind area, and the user will not feel that the image 1 and the image 2 are compressed, which thereby improves the user experience of the telepresence video conference.

The image processing method provided in the embodiments of the present invention is introduced above. In the embodiments of the present invention, the width of the blind area in the splicing of the at least two channels of images is compared with the sum of the widths of the left border and the right border of the display apparatus in the local conference site, and separately, the at least two channels of images are cut or loaded with a black band according to the comparison result, so that the at least two channels of processed images adapt to the size of the display apparatus in the local conference site, which thereby achieves the optimal image display effect and improves the user experience of the telepresence video conference.

Figure 4:
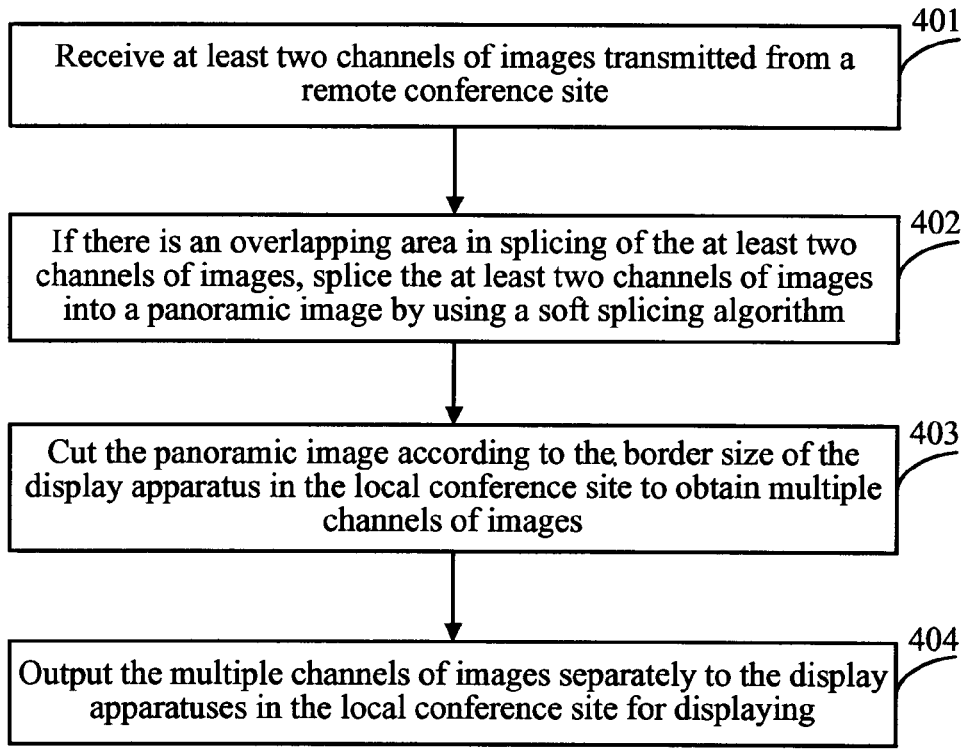
FIG. 4 is a schematic flow chart of an image processing method according to an embodiment of the present invention.

Referring to FIG. 4, FIG. 4 is a schematic flow chart of another image processing method according to an embodiment of the present invention. As shown in FIG. 4, the method may include the following steps.

401: Receive at least two channels of images transmitted from a remote conference site.

402: If there is an overlapping area in splicing of the at least two channels of images, splice the at least two channels of images into a panoramic image by using a soft splicing algorithm.

The objective of splicing the at least two images into the panoramic image by suing the soft splicing algorithm is to remove the overlapping area.

A common soft splicing algorithm is: obtaining a public matching point pair of multiple images in the overlapping area by detecting and matching feature points, calculating a position mapping relation between the images by using the public matching point pair, and obtaining the panoramic image by projecting multiple images into one coordinate system through a planar, cylindrical or spherical coordinate transformation. The soft splicing algorithm is a commonly-known technology in the technical field of the panoramic image splicing.

403: Cut the panoramic image according to the border size of the display apparatus in the local conference site to obtain multiple channels of images.

Further, if the display apparatus in the local conference site is a panoramic seamless display apparatus (such as a high resolution projection display apparatus or an 108-inch Liquid Crystal Display), the panoramic image does not need to be cut, and the panoramic image may be directly output to the panoramic seamless display apparatus for displaying.

404: Output the multiple channels of images separately to the display apparatuses in the local conference site for displaying.

Further, in the embodiments of the present invention, after step 403 is performed and before step 404 is performed, the multiple channels of obtained images may undergo stretching or shrinking processing separately, so that the multiple channels of images adapt to the size of the display apparatus in the local conference site For example, if the display apparatuses in the local conference site are the seamless display apparatuses, and a human figure is not at a splicing position of the image, the panoramic image may be cut in the middle and displayed separately in the corresponding multiple seamless displays.

If the human figure is at the splicing position of the image, the following processing may be performed: identifying the human face, where the cutting line for cutting the panoramic image should not be on the human face, performing stretching or shrinking processing after the cutting, and then displaying at the corresponding multiple seamless displays;

If the entire human figure, including the arms, is at the image splicing position, identifying the entire human figure so that the cutting will not divide the human figure into two halves, or, cutting at the actual joining line of the image because the seamless screen is used for displaying.

For example, if the display apparatuses in the local conference site are the narrow seam display apparatuses and the human figure is at the splicing position of the image, when the panoramic image is cut, the entire human face or the entire human figure needs to be in one image and then be displayed in the narrow seam display apparatuses so that a good effect is achieved. Otherwise, a half of the human face may be in the image of the left display apparatus and the other half may be in the image of the right display apparatus, or one eye may be in the image of the left display apparatus and the other eye may be in the image of the right display apparatus, which brings bad experience to the users.

If the cutting is not in the middle, the resolutions of the cut images are different, and directly displaying the cut images in respective narrow seam display apparatuses may lead to confusion in displaying and wrong proportion. As a result, one human figure may be big and the other human figure may be small. Therefore, further zooming or cutting is needed. For example, after cutting, the image resolution of the left display apparatus is smaller than the image resolution of the right display apparatus. In this case, the image resolution of the left display apparatus may not be processed, and an unimportant scene at the very right side of the image of the right display apparatus is cut so that the image resolution of the left display apparatus and the image resolution of the right display apparatus are consistent, or, the image in the left display apparatus is properly zoomed so that the resolutions of the two are consistent and then the two are displayed separately.

Preferably, the image processing method provided in the embodiments of the present invention may further include the following steps.

(1) Receive information which is about the display apparatus in the remote conference site and transmitted from the remote conference site.

For example, the remote conference site may transmit the information about the display apparatus in the remote conference site through a dedicated channel, or may carry the information about the display apparatus in the remote conference site by extending the communication protocol between the remote conference site and the local conference site, such as extending H.323, H.320, SIP, E1.

The display apparatus information is used to indicate that the display apparatus in the remote conference site is the panoramic seamless display apparatus, or is the narrow seam display apparatus, the wide seam display apparatus, or the seamless display apparatus which is mentioned above.

(2) Adjust the shooting mode of the video cameras in the local conference site according to the display apparatus information.

For example, if the display apparatus information in step (1) indicates that the display apparatus in the remote conference site is the panoramic seamless display apparatus, the shooting mode of the video cameras in the local conference site may be adjusted to the co-optical-center mode, the approximate co-optical-center mode, or the convergence mode in step (2); otherwise, the shooting mode of the video cameras in the local conference site may be adjusted to the divergence mode in step (2).

In the embodiments of the present invention, the width of the blind area after the splicing of the at least two channels of images is compared with the sum of the widths of a left border and a right border of the display apparatus in the local conference site, and the at least two channels of images are processed separately according to the comparison result (such as cutting or loading a black band), so that the at least two channels of processed images match the size of the display apparatus in the local conference site, which thereby achieves an optimal image display effect and improves the user experience in a telepresence video conference. In addition, in the embodiments of the present invention, the shooting mode of the video cameras in the local conference site may be adjusted according to the information about display apparatus in the remote conference site, which thereby achieves a better shooting effect.

Figure 5:
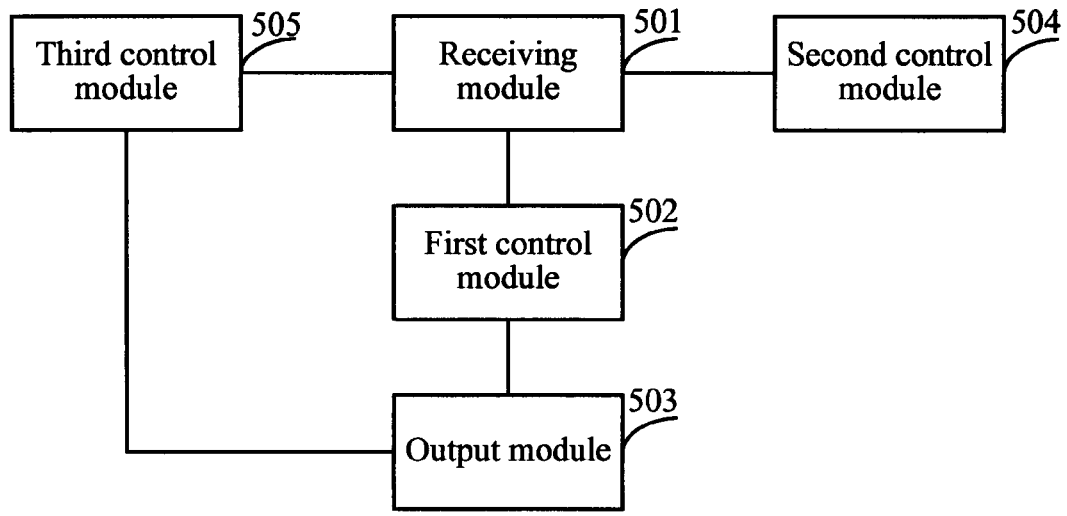
FIG. 5 is a schematic structural diagram of an image processing device according to an embodiment of the present invention.

Referring to FIG. 5, FIG. 5 is a schematic structural diagram of an image processing device according to an embodiment of the present invention. As shown in FIG. 5, the image processing device may include:

a receiving module 501, configured to receive at least two channels of images transmitted from a remote conference site;

a first control module 502, configured to compare the width of the blind area with the sum of the widths of a left border and a right border of a display apparatus in a local conference site if there is a blind area in splicing of the at least two channels of images, and process the at least two channels of images separately according to a comparison result; and an output module 503, configured to output the at least two channels of images processed by the first control module 502 separately to the display apparatuses in the local conference site for displaying.

Further, the receiving module 501 is also configured to receive information which is about the display apparatus in the remote conference site and transmitted from the remote conference site, where the display apparatus information is used to indicate that the display apparatus in the remote conference site is a panoramic seamless display apparatus, or is the narrow seam display apparatus, the wide seam display apparatus, or the seamless display apparatus which is mentioned above.

In this case, the image processing device may further include:

a second control module 504, configured to adjust a shooting mode of the video cameras in the local conference site according to the display apparatus information.

For example, the second control module 502 may, when the display apparatus in the remote conference site is the panoramic seamless display apparatus, adjust the shooting mode of the video cameras in the local conference site to the co-optical-center mode, the approximate co-optical-center mode, or the convergence mode. The objective of the adjustment is to make the multiple channels of images taken by the video cameras in the remote conference site better adapt to the panoramic splicing so that finally the panoramic seamless display apparatus in the remote conference site performs a function of panoramic displaying to the greatest extent. On the contrary, if the display apparatus in the remote conference site is not the panoramic seamless display apparatus, the second control module 502 may adjust the shooting mode of the video cameras in the local conference site to the divergence mode.

Figure 6:
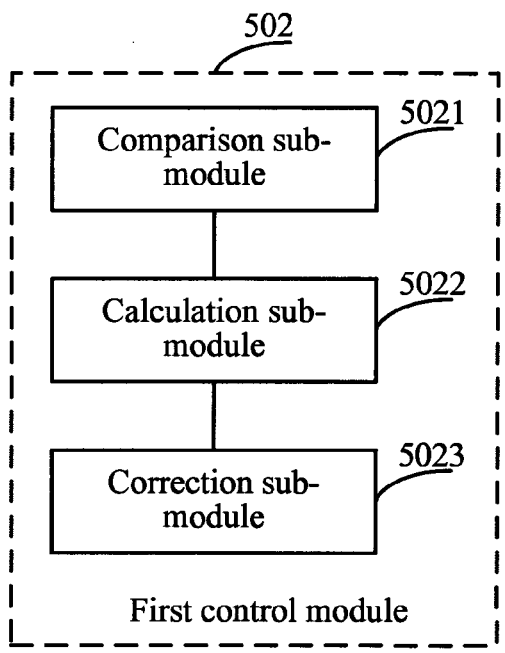
FIG. 6 is a schematic structural diagram of a first control module according to an embodiment of the present invention.

Referring to FIG. 6 together, FIG. 6 is a schematic structural diagram of a first control module according to an embodiment of the present invention. As shown in FIG. 6, the first control module 502 may include:

a comparison sub-module 5021, configured to compare the width of a blind area with the sum of the widths of a left border and a right border of a display apparatus in a local conference site, when there is a blind area in splicing of the at least two channels of images received by the receiving module 501;

a calculation sub-module 5022, configured to calculate a difference between the width of the blind area and the sum of the widths of the left border and the right border of the display apparatus in the local conference site, and use a half of the difference as a correction value of the at least two channels of images, when the width of the blind area is greater than the sum of the widths of the left border and the right border of the display apparatus in the local conference site; and a correction sub-module 5023, configured to load a black band with a width that equals the correction value on each of adjacent edges of the at least two channels of images.

Further, the calculation sub-module 5022 provided in the embodiment of the present invention may also calculate the difference between the width of the blind area and the sum of the widths of the left border and the right border of the display apparatuses in the local conference site, and use a half of the difference as the correction value of the at least two channels of images, when the width of the blind area is smaller than the sum of the widths of the left border and the right border of the display apparatuses in the local conference site.

Then, the correction sub-module 5023 may also cut an edge with a width that equals the correction value from each of the adjacent edges of the at least two channels of images.

As shown in FIG. 5, the image processing device provided in an embodiment of the present invention may further include:

a third control module 505, configured to splice the at least two channels of images into a panoramic image by using a soft splicing algorithm, when there is an overlapping area in the splicing of the at least two channels of images; and cut the panoramic image according to the border size of the display apparatus in the local conference site, to obtain multiple channels of images.

In this case, the output module 503 may also output the multiple channels of obtained images separately to the display apparatuses in the local conference site for displaying.

The objective of splicing the at least two images into one panoramic image by using the soft splicing algorithm is to remove the overlapping area.

A common soft splicing algorithm is obtaining a public matching point pair of multiple images in the overlapping area by detecting and matching feature points, calculating a position mapping relation between the images by using the public matching point pair, and obtaining the panoramic image by projecting multiple images into one coordinate system through a planar, cylindrical or spherical coordinate transformation. The soft splicing algorithm is a commonly-known technology in the technical field of the panoramic image splicing.

It should be noted that, the image processing device provided in the embodiments of the present invention may also be applied in the remote conference site to fulfill the same function, which is not limited in the embodiments of the present invention.

In the image processing device provided in the embodiments of the present invention, the width of the blind area in the splicing of the at least two channels of images is compared with the sum of the widths of the left border and the right border of the display apparatus in the local conference site, and separately, the at least two channels of images are cut or loaded with a black band according to the comparison result, so that the at least two channels of processed images adapt to the size of the display apparatuses in the local conference site, which thereby achieves an optimal image display effect and improves the user experience in a telepresence video conference. In addition, in the embodiments of the present invention, the shooting mode of the video cameras in the local conference site may be adjusted according to the information about the display apparatus in the remote conference site, which thereby achieves a better shooting effect.

Those of ordinary skill in the art should understand that all or a part of the steps of the methods according to the embodiments of the present invention may be implemented by a program instructing relevant hardware. The program may be stored in a computer readable storage medium. The storage medium may be a ROM, a RAM, a magnetic disk or an optical disk.

The objectives, technical solutions, and beneficial effects of the present invention have been described in further detail through the above specific implementation manners. It should be understood that the above descriptions are merely specific implementation manners of the present invention, but are not intended to limit the protection scope of the present invention. Any modification, equivalent replacement, or improvement made within the spirit and principle of the present invention should fall within the protection scope of the present invention.

What is claimed is that:

1. An image processing method, comprising:
receiving at least two channels of images transmitted from a remote conference site;
comparing the width of a blind area with the sum of the widths of a left border and a right border of a display apparatus in a local conference site, if there is a blind area in splicing of the at least two channels of images;
processing the at least two channels of images separately according to a comparison result; and
outputting the at least two channels of processed images separately to the display apparatuses in the local conference site for displaying.

2. The method according to claim 1, further comprising:
receiving information which is about the display apparatus in the remote conference site and transmitted from the remote conference site; and
adjusting a shooting mode of video cameras in the local conference site according to the display apparatus information.

3. The method according to claim 2, wherein the adjusting the shooting mode of the video cameras in the local conference site according to the display apparatus information comprises:
if the display apparatus in the remote conference site is a panoramic seamless display apparatus, adjusting the shooting mode of the video cameras in the local conference site to a co-optical-center mode, an approximate co-optical-center mode, or a convergence mode; otherwise, adjusting the shooting mode of the video cameras in the local conference site to a divergence mode.

4. The method according to claim 1, wherein the processing the at least two channels of images separately according to the comparison result comprises:
calculating a difference between the width of the blind area and the sum of the widths of the left border and the right border of the display apparatus in the local conference site, if the width of the blind area is greater than the sum of the widths of the left border and the right border of the display apparatuses in the local conference site;
using a half of the difference as a correction value of the at least two channels of images; and
loading a black band with a width that equals the correction value on each of adjacent edges of the at least two channels of images.

5. The method according to claim 4, further comprising:
calculating a difference between the width of the blind area and the sum of the widths of the left border and the right border of the display apparatus in the local conference site if the width of the blind area is smaller than the sum of the widths of the left border and the right border of the display apparatus in the local conference site;
using a half of the difference as a correction value of the at least two channels of images; and
cutting an edge with a width that equals the correction value from each of the adjacent edges of the at least two channels of images.

6. The method according to claim 1, further comprising:
splicing the at least two channels of images into a panoramic image by using a soft splicing algorithm, if there is an overlapping area in the splicing of the at least two channels of images;
cutting the panoramic image according to the border size of the display apparatus in the local conference site to obtain multiple channels of images; and outputting the multiple channels of images separately to the display apparatuses in the local conference site for displaying.

7. The method according to claim 6, before the outputting the multiple channels of images separately to the display apparatuses in the local conference site for displaying, further comprising:

performing stretching or shrinking processing on the multiple channels of obtained images separately, so that the images adapt to the border size of the display apparatus in the local conference site.

8. An image processing device, comprising:

a receiving module, configured to receive at least two channels of images transmitted from a remote conference site;

a first control module, configured to, when there is a blind area in splicing of the at least two channels of images, compare the width of a blind area with the sum of the widths of a left border and a right border of a display apparatus in a local conference site, and process the at least two channels of images separately according to a comparison result; and an output module, configured to output the at least two channels of images processed by the first control module, separately, to the display apparatuses in the local conference site for displaying.

9. The image processing device according to claim 8, wherein the receiving module is also configured to receive information which is about the display apparatus in the remote conference site and transmitted from the remote conference site, and the image processing device further comprises:

a second control module, configured to adjust a shooting mode of video cameras in the local conference site according to the display apparatus information.

10. The image processing device according to claim 9, wherein the second control module is specifically configured to adjust the shooting mode of the video cameras in the local conference site to a co-optical-center mode, an approximate co-optical-center mode, or a convergence mode, when the display apparatus in the remote conference site is a panoramic seamless display apparatus; otherwise, adjust the shooting mode of the video cameras in the local conference site to a divergence mode.

11. The image processing device according to claim 8, wherein the first control module comprises:

a comparison sub-module, configured to compare the width of the blind area with the sum of the widths of the left border and the right border of the display apparatus in the local conference site, when there is a blind area in splicing of the at least two channels of images received by the receiving module;

a calculation sub-module, configured to, when the width of the blind area is greater than the sum of the widths of the left border and the right border of the display apparatus in the local conference site, calculate a difference between the width of the blind area and the sum of the widths of the left border and the right border of the display apparatus in the local conference site, and use a half of the difference as a correction value of the at least two channels of images; and a correction sub-module, configured to load a black band with a width that equals the correction value on each of adjacent edges of the at least two channels of images.

12. The image processing device according to claim 11, wherein the calculation sub-module is also configured to, when the width of the blind area is smaller than the sum of the widths of the left border and the right border of the display apparatuses in the local conference site, calculate a difference between the width of the blind area and the sum of the widths of the left border and the right border of the display apparatus in the local conference site, and use a half of the difference as the correction value of the at least two channels of images;

the correction sub-module is also configured to cut an edge with a width that equals the correction value from each of adjacent edges of the at least two channels of images.

13. The image processing device according to claim 8, further comprising:

a third control module, configured to splice the at least two channels of images into a panoramic image by using a soft splicing algorithm, if there is an overlapping area in the splicing of the at least two channels of images; and cut the panoramic image according to the border size of the display apparatus in the local conference site to obtain multiple channels of images, the output module is also configured to output the multiple channels of images separately to the display apparatuses in the local conference site for displaying.

\* \* \* \* \*